(12) United States Patent
Gomes et al.

(10) Patent No.: US 12,608,479 B2
(45) Date of Patent: Apr. 21, 2026

(54) SECURE INITIAL PROGRAM LOAD (IPL) CODE LOADING ATTRIBUTES FACILITY

(71) Applicant: INTERNATIONAL BUSINESS MACHINES CORPORATION, Armonk, NY (US)

(72) Inventors: Louis P. Gomes, Poughkeepsie, NY (US); Peter Oberparleiter, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 18/164,705

(22) Filed: Feb. 6, 2023

(65) Prior Publication Data

US 2024/0265108 A1 Aug. 8, 2024

(51) Int. Cl.
| | |
|---|---|
| *G06F 21/00* | (2013.01) |
| *G06F 21/54* | (2013.01) |
| *G06F 21/57* | (2013.01) |
| *G06F 21/60* | (2013.01) |

(52) U.S. Cl.
CPC ............ G06F 21/575 (2013.01); G06F 21/54 (2013.01); G06F 21/602 (2013.01)

(58) Field of Classification Search
CPC ....... G06F 21/575; G06F 21/54; G06F 21/602
See application file for complete search history.

(56) References Cited

U.S. PATENT DOCUMENTS

| | | | | |
|---|---|---|---|---|
| 10,615,989 | B2 | 4/2020 | Kreft | |
| 10,902,126 | B2 | 1/2021 | Sutton | |
| 11,374,773 | B2 | 6/2022 | Kreft | |
| 11,500,787 | B2 * | 11/2022 | Wei | G06F 12/0882 |
| 2018/0260569 | A1 * | 9/2018 | Sutton | H04L 63/18 |
| 2020/0342111 | A1 * | 10/2020 | Gomes | G06F 21/575 |
| 2025/0124156 | A1 * | 4/2025 | Beecham | G06F 16/9024 |

OTHER PUBLICATIONS

Disclosed Anonymouly, "Security layer to prevent access to file system objects from malicious code," IP.com, Aug. 10, 2005, 3 pages, IP.com No. IPCOM000126911D, Retrieved from the Internet: <URL: https://priorart.ip.com/IPCOM/000126911>.
Disclosed Anonymously, "ETL Stage for Malicious Code Neutralization," IP.com, Apr. 12, 2021, 4 pages, IP.com No. IPCOM000265448D, Retrieved from the Internet: <URL: https://priorart.ip.com/IPCOM/000265448>.

(Continued)

*Primary Examiner* — William A Corum, Jr.
(74) *Attorney, Agent, or Firm* — Stosch Sabo

(57) ABSTRACT

A method, system, and computer program product are provided for preventing malicious code injection during Initial Program Load (IPL). A secure code loading attributes block (SCLAB) is appended to a variable sized signed binary code component to generate a combined component. The variable sized signed binary code component is Operating System (OS) code for an initial program load (IPL) process. The SCLAB comprises contents that include a length field, an identifier, flag fields, a load program status word (PSW) and a load address. The combined component is digitally signed. During IPL, the unsigned component table entries associated with the signed component are verified against the SCLAB contents.

20 Claims, 9 Drawing Sheets

SCLAB 200

| Fmt 230 | Rsvd | Flags 205 | | Reserved | | |
|---|---|---|---|---|---|---|
| Load PSW 210 | | | | | | |
| Load Address 215 | | | | | | |
| Reserved | | Length 220 | | Magic Number 225 | | |

(56) References Cited

OTHER PUBLICATIONS

Disclosed Anonymously, "Vulnerability Scanning when Inserting Code," IP.com, Jun. 15, 2022, 6 pages, IP.com No. IPCOM000270210D, Retrieved from the Internet <URL: https://priorart.ip.com/IPCOM/000270210>.

Faisina, et al., "Grab 'n Run: Secure and Practical Dynamic Code Loading for Android Applications," ACSAC '15 [conference], Dec. 7-11, 2015, 10 pages, Los Angeles, CA, ACM 978-1-4503-3682-6/15/12, DOI: 10.1145/2818000.2818042, Retrieved from the Internet: <URL: https://sites.cs.ucsb.edu/~vigna/publications/2015_ACSAC_GrabNRun.pdf>.

Unknown Author, "Malicious Code," Cyber Awareness Challenge 2022 [unclassified], 2022, 2 pages, Retrieved from the Internet: <URL: https://dl.dod.cyber.mil/wp-content/uploads/tmn/online/disa_cac_2022_final_web/pdf/DISA_CAC2022_MaliciousCode.pdf>.

* cited by examiner

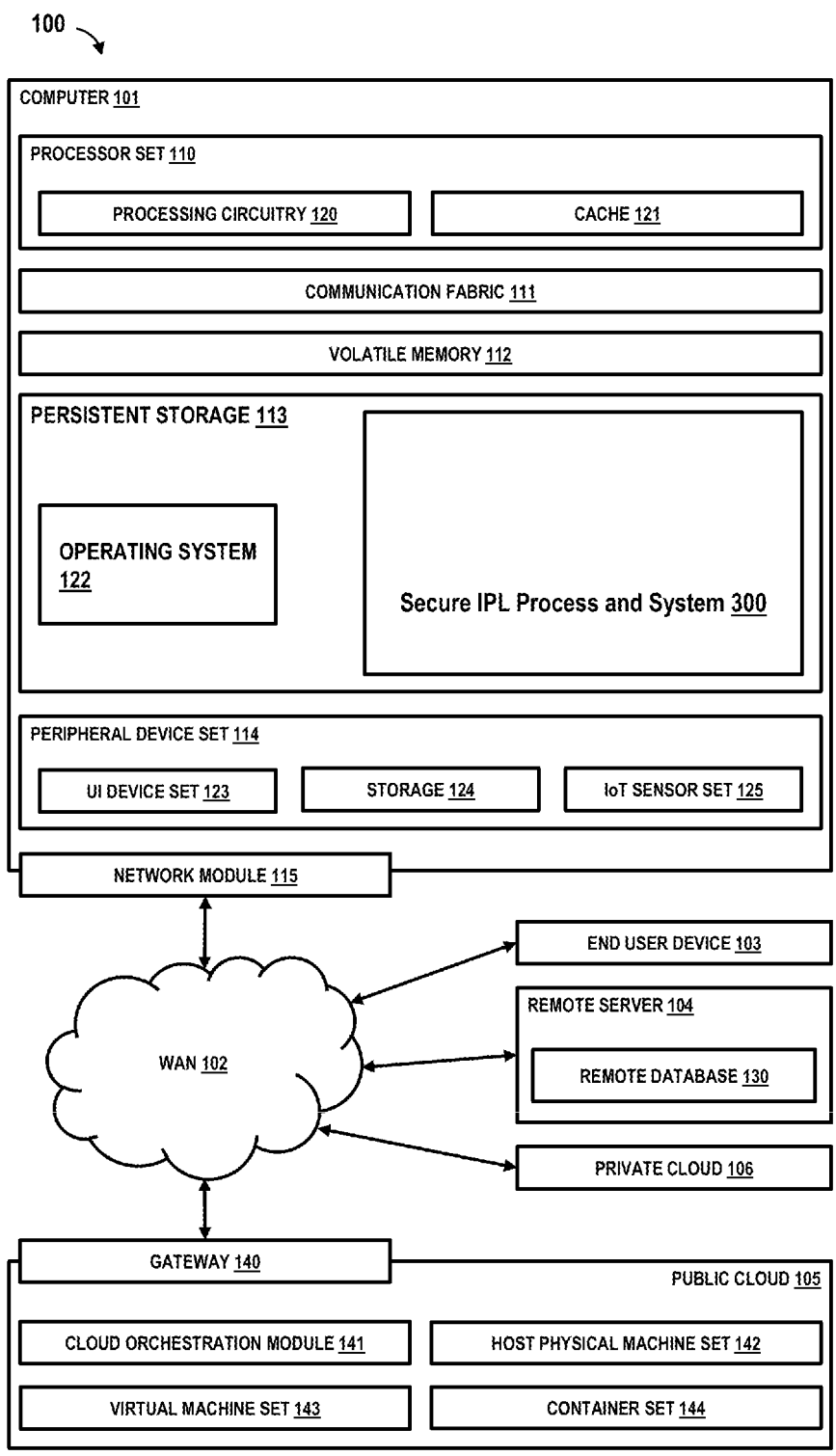

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

Secure IPL Process and System 300

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

Secure IPL process    300

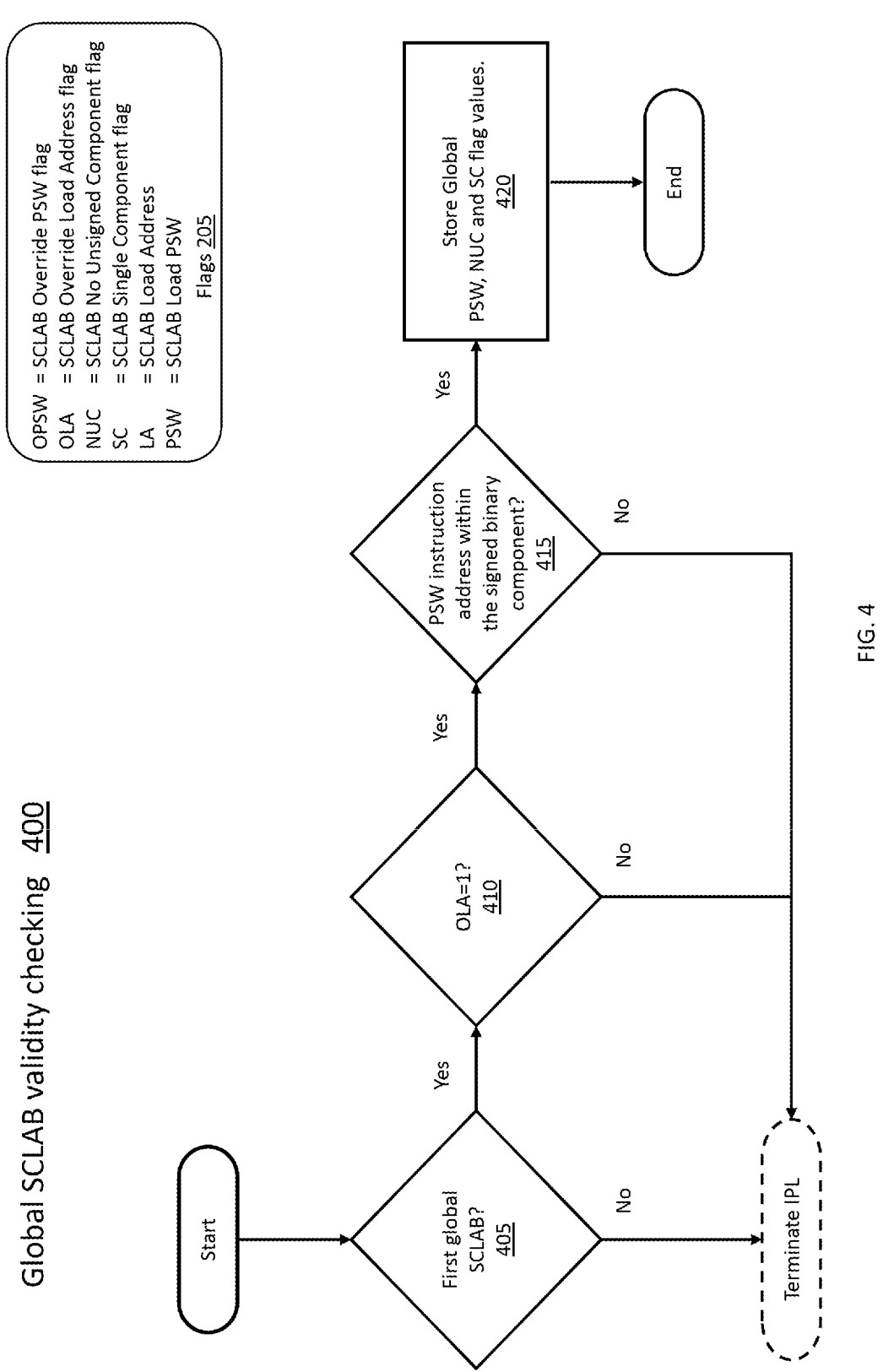

Global SCLAB validity checking   400

OPSW  = SCLAB Override PSW flag
OLA    = SCLAB Override Load Address flag
NUC   = SCLAB No Unsigned Component flag
SC     = SCLAB Single Component flag
LA     = SCLAB Load Address
PSW   = SCLAB Load PSW Flags 205

Start

First global SCLAB? 405

Yes

OLA=1? 410

Yes

PSW instruction address within the signed binary component? 415

Yes

Store Global PSW, NUC and SC flag values. 420

End

No → No → No → Terminate IPL

FIG. 4

SCLAB validity checking    500

OPSW = SCLAB Override PSW flag
OLA  = SCLAB Override Load Address flag
NUC  = SCLAB No Unsigned Component flag
SC   = SCLAB Single Component flag
LA   = SCLAB Load Address
PSW  = SCLAB Load PSW
Flags 205

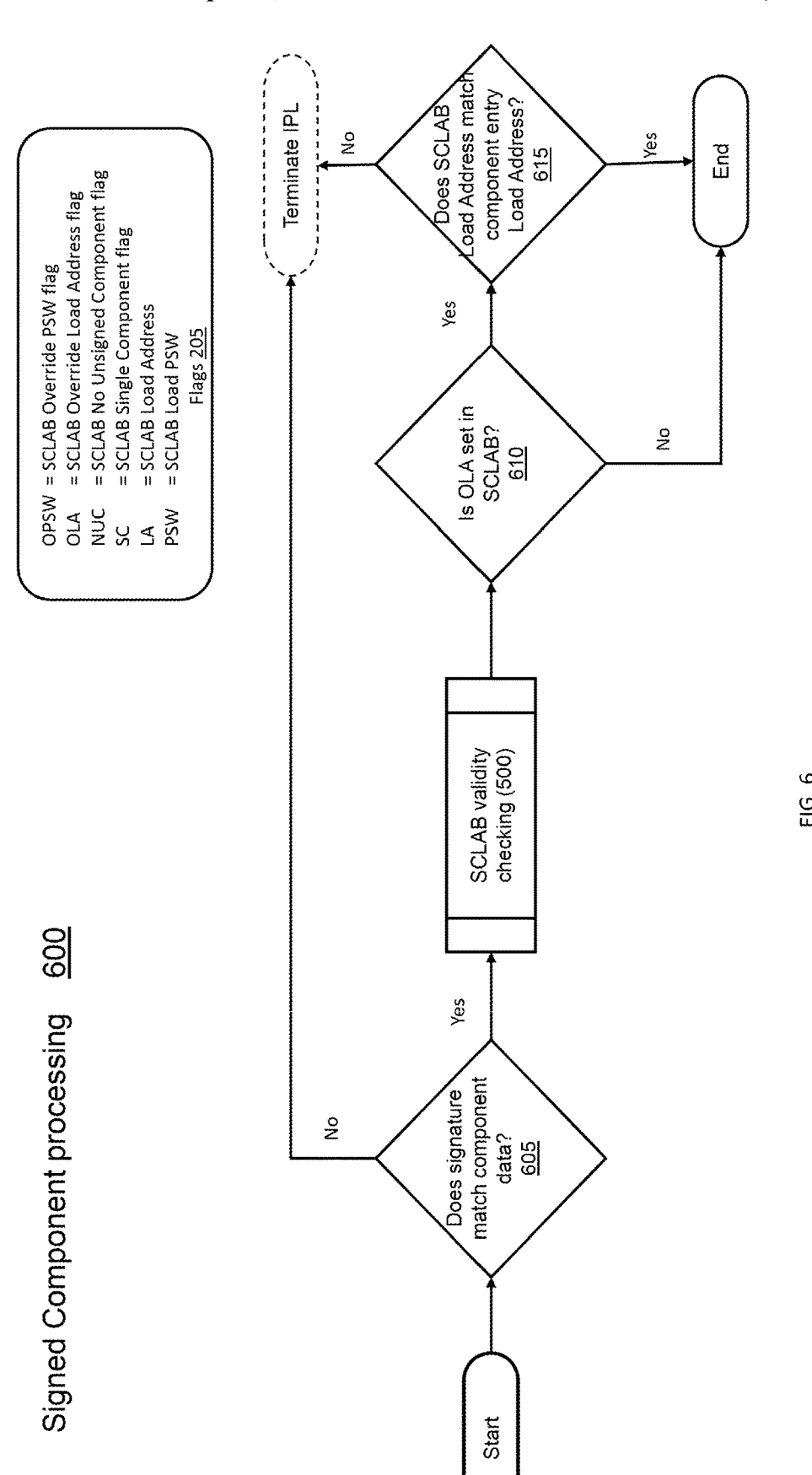

Signed Component processing 600

OPSW = SCLAB Override PSW flag
OLA = SCLAB Override Load Address flag
NUC = SCLAB No Unsigned Component flag
SC = SCLAB Single Component flag
LA = SCLAB Load Address
PSW = SCLAB Load PSW Flags 205

Start

Does signature match component data? 605

No → Terminate IPL

Yes

SCLAB validity checking (500)

Is OLA set in SCLAB? 610

Yes → Does SCLAB Load Address match component entry Load Address? 615

No → Terminate IPL

Yes → End

No → End

FIG. 6

Load Binary processing   700

SECURE INITIAL PROGRAM LOAD (IPL) CODE LOADING ATTRIBUTES FACILITY

BACKGROUND

The present invention relates to computer systems, and more specifically to securely loading code at initial program load.

While various hardware and software security measures makes it difficult for an attacker to load malicious code into an operating system (OS), some exposures exist during initial program load.

It would be advantageous to provide a secure code loading facility to prevent an attacker from injecting malicious code in the load device in order to alter secure boot execution path.

SUMMARY

A method is provided. A secure code loading attributes block (SCLAB) is appended to a variable sized signed binary code component to generate a combined component. The variable sized signed binary code component is Operating System (OS) code for an initial program load (IPL) process. The SCLAB comprises contents that include a length field, an identifier, flag fields, a load program status word (PSW) and a load address. The combined component is digitally signed. During IPL, the signed combined component is verified against the SCLAB contents. Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 illustrates the operating environment of a computer server for executing the secure IPL code loading attributes facility, according to an embodiment of the present invention;

FIG. 4 illustrates an exemplary global signed code loading attributes block (SCLAB) validation process, in accordance with one or more aspects of the present invention;

FIG. 6 illustrates an exemplary process for validating signed binary components, in accordance with one or more aspects of the present invention;

DETAILED DESCRIPTION

Implementation of security features that are built into the hardware and software of a computer make it more difficult for an attacker to inject malicious code into the boot (IPL) process.

The boot process can vary depending on the computer architecture. In general, and in summary, the boot process takes program data from a boot device and loads it into specific locations in computer memory, after which the CPU is instructed to start execution of the program data at a specific address in the computer memory.

Figure 9:
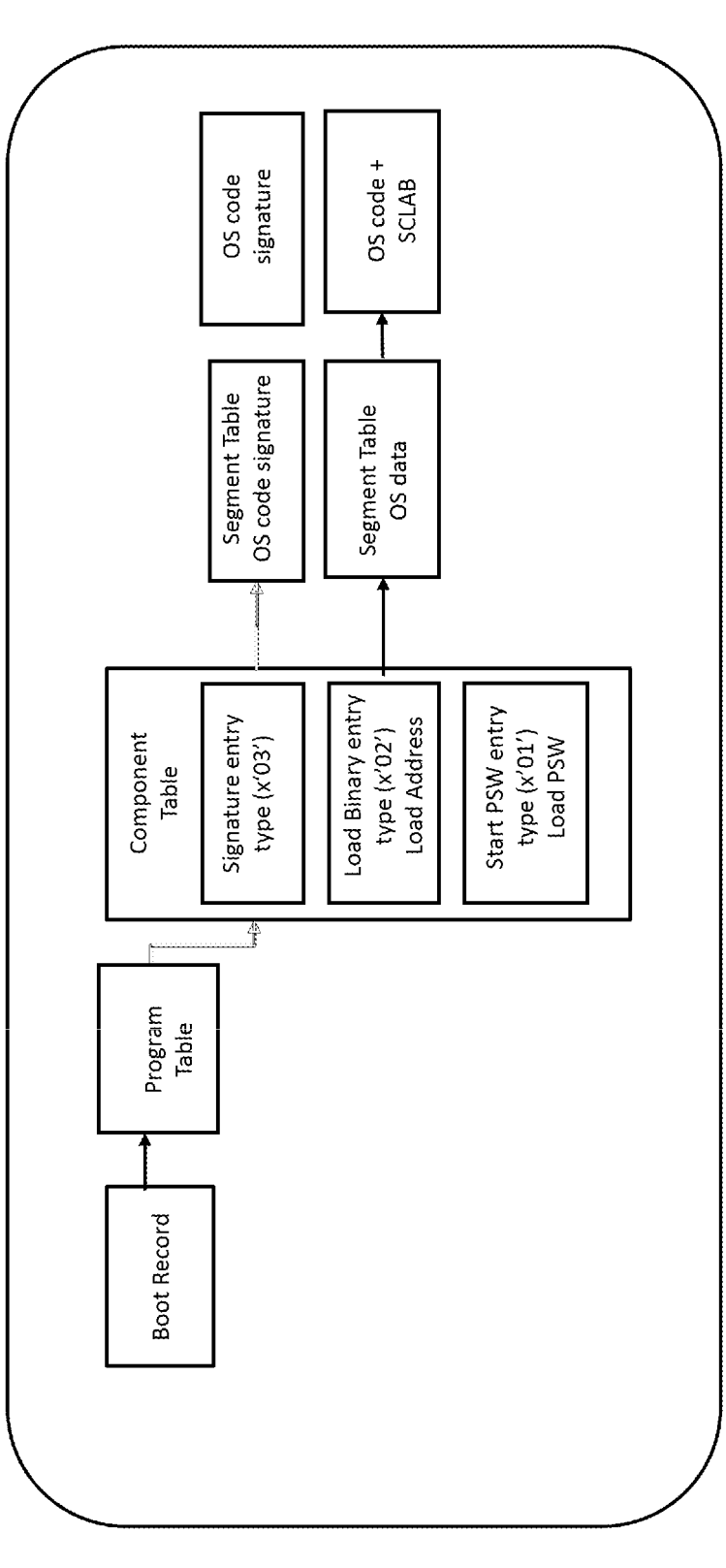
FIG. 9 illustrates a simplified hierarchy of boot device structures as used in an exemplary boot process.

Data is organized on the IPL device into a boot record and a hierarchy of tables. FIG. 9 illustrates a simplified hierarchy of boot device structures 900 used during the boot process.

The boot record points to a program table, which comprises a number of pointers, i.e., addresses. Each pointer represents an address of a component table, which designates components of a program to load during IPL. Each of the component table entries includes an indicator of component type, and for the binary code type, a location in memory into which the component is to be stored. Depending on the computer architecture, a component can be signed or unsigned binary data, such as executable code, or can be parameter data which is generally unsigned because it is not binary. As referred to herein, a signed binary component is one that is protected by a digital signature. A signature information entry is another type of component table entry, and it contains the signature of the corresponding signed binary component. A final component table entry designates the code entry point to be used to start the program via a program status word (PSW).

To initiate the boot process, the computer processor executes code to locate a boot device, from which boot loader software is loaded into a well-known location in random access memory (RAM). This begins the IPL process. Encryption keys placed on the computer hardware together with digital signature checking enforced by the computer firmware can be used to detect unauthorized modifications of relevant boot code and data and terminate IPL in that case.

In current computer architecture, the boot process is particularly vulnerable because critical structures such as registers, flags, PSWs and interrupt handler addresses are stored in well-known addresses in real memory storage. A knowledgeable attacker can strategically add unsigned components to the boot process. This can result, for example, in overlaying certain real storage locations with a PSW that points to the malicious code. The malicious code can also enable the PSW for interrupts, and subsequently cause execution to branch to an interrupt handler that is the malicious code.

One way to prevent manipulation of the boot process is to add signature encryption to these critical structures, and to each OS component to be loaded. However, as these critical structures are highly demanded during the boot process, this choice requires a trade-off between potentially increasing security and the performance impact of the additional decryption and authentication. Further, requiring each OS component to be signed consumes disk space to store the added signature structures. Moreover, the added encryption necessarily increases the complexity of the operation of the computer, as the OS, user tasks, and hardware all require conflict resolution to ensure synchronized access to the resources. The need to ensure synchronization also makes maintaining or adding new functions to the OS more challenging, as complexity likely increases the opportunity for introducing errors. It should be noted that requiring all components to be signed may not be feasible for certain environments, depending on the hardware/software architecture.

Embodiments of the present invention address the security vulnerabilities currently existing in the art by providing a system and method for preventing an attacker from injecting malicious code and altering the boot process. This is accomplished by introducing a secure code loading attributes block (SCLAB), which is appended directly to the end of each signed binary component. While there can be both signed and unsigned components, appending a SCLAB is only required for those that are signed. This is because adding a SCLAB to unsigned components would not add security. In that case, either the SCLAB, being unsigned, allows an attacker with suitable access to modify the boot device to facilitate an attack, or the loaded component data is itself unsigned, allowing for the same kind of attack.

As shown in the Figures, the SCLAB includes a series of flags 205 that can be set to control the actions of the boot loader during IPL. The software/development engineers set the flags during the software build process prior to packaging and deployment based on knowledge of the OS architecture. The ability to customize the settings of the flags 205 provides flexibility in implementing the SCLAB according to the requirements of different OS architectures. For example, in a z/OS® implementation the flag combination can include that only one binary component is allowed, and that the binary component must be signed. In contrast, for Linux® the flags can include a setting to allow more than one signed binary component. These are high-level but incomplete examples, as the SCLAB contains code loading attributes of the current signed binary component and may provide direction on how to process the rest of the components in the component table. The SCLAB may provide further validation of information on where to load the signed binary code from the load device, and where to start the execution of the loaded OS code. z/OS® is the registered trademark of IBM in the United States. Linux® is the registered trademark of Linus Torvalds in the U.S. and other countries.

The SCLAB is stored at the end of the signed binary component; that is, the SCLAB is stored such that the last byte of SCLAB appears in the last byte of the last segment of the current binary component. One or more signed binary components may be present, and each signed binary component must contain a SCLAB. The SCLAB contains code loading attributes of the current signed binary component and may provide direction on how to process the rest of the components in the component table. The SCLAB may provide further validation of information on where to load the signed binary code from the load device, and where to start the execution of the loaded OS code.

Any unused data area in the binary component between the end of the binary code and the beginning of the SCLAB may be padded with zeroes, depending on the architecture of the load device. The entire data area of the binary component, which includes the SCLAB and any padding, is pointed to by the segment pointers in the component table entry and must be signed to protect it and the SCLAB from an attacker. Therefore, the SCLAB and any padding must be included in the signature to be verified and must be included in the signature verification process as well.

The SCLAB is a variable length control block. The entire SCLAB is located at the end of the signed binary component. The last 8 bytes of the signed binary component contains the SCLAB origin locator. Byte "0" of the SCLAB is located by subtracting the number of bytes indicated in the SCLAB length field from the address of the last byte of the binary code element plus "1". Therefore, the contents of the SCLAB, such as the flags 205, load PSW 210, and load address 215 are found at known offsets from byte "0" of the SCLAB regardless of the variable length.

Embodiments of the present invention are described with reference to the z/OS® operating system. However, by setting the various SCLAB flags and other fields appropriately, this present invention of the SCLAB can be implemented in other operating systems.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as the secure IPL process and system (system) 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
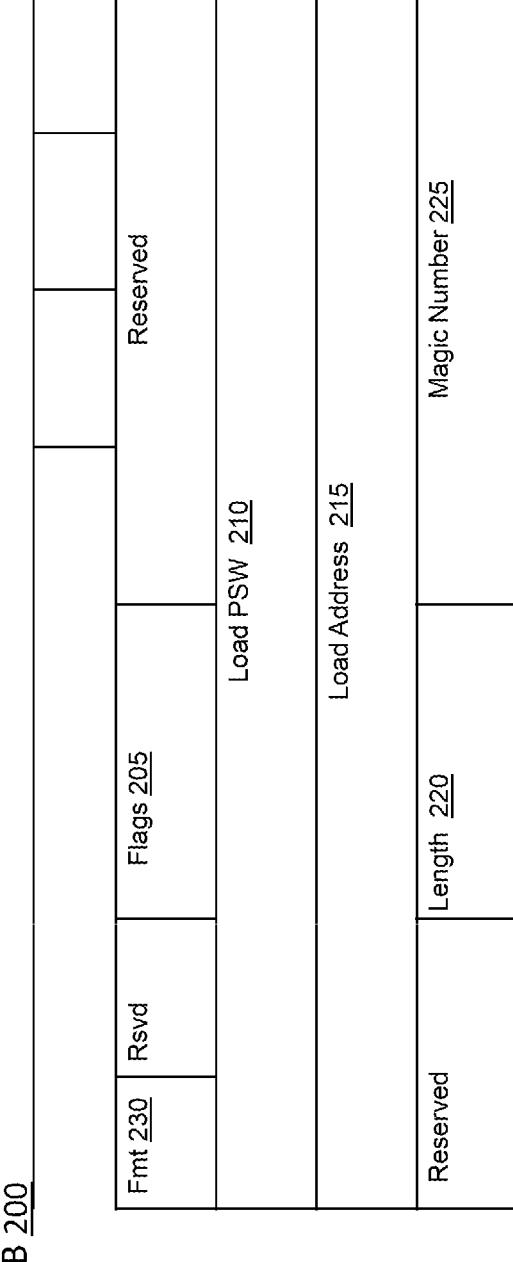
FIG. 2 illustrates an exemplary SCLAB, in accordance with one or more aspects of the present invention.

FIG. 2 illustrates an exemplary SCLAB, in accordance with one or more aspects of the present invention. The SCLAB can be added to the OS signed binary code components to extend the security protection provided by an existing facility. Only those fields used in the current implementation of this invention are shown.

When used in conjunction with an existing security protection facility, all signed OS components must have a SCLAB that is stored at the end of the signed component. If there are more than one signed binary components, each must contain a SCLAB.

Flags 205 are used to specify the scope of validation to be performed during the boot process. Fewer flags set will result in fewer validation rules being applied.

The SCLAB length 220 specifies the number of bytes in the SCLAB. In this implementation the SCLAB length 220 is an unsigned binary integer, the length of which can vary depending on the implementation. Having a length field provides adaptability and compatibility, since the contents and length of the SCLAB can be readily modified to support different implementations.

The magic 225 field includes an eyecatcher that identifies this field as the end of a SCLAB. It also identifies the presence of the SCLAB itself. As an additional security measure, the magic 225 field will be validated during IPL. The segments of the signed binary component may vary in length, but the SCLAB is always at the end.

FIGS. 3-8 illustrate the usage of the SCLAB, as implemented in z/OS®.

Figure 3:
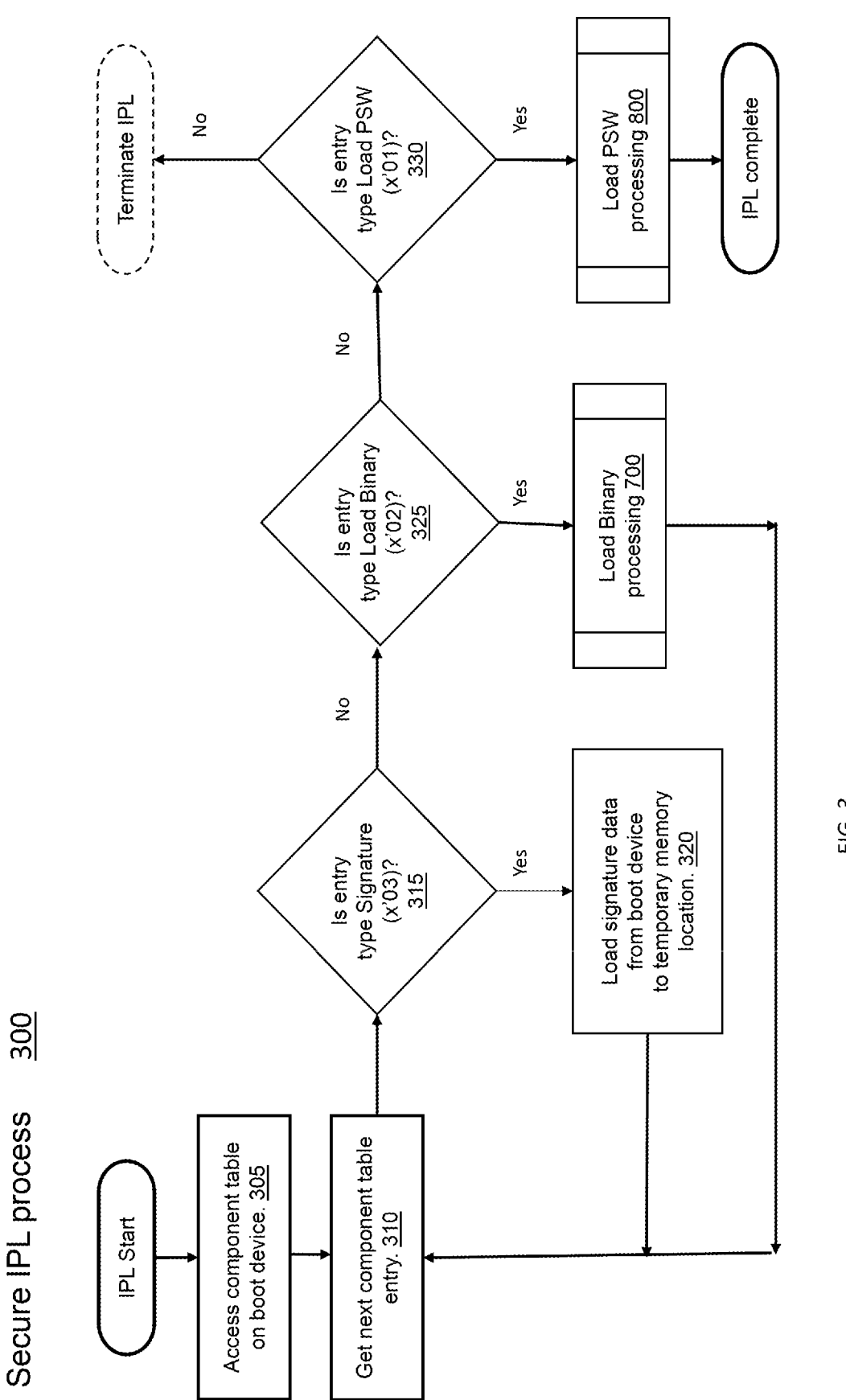
FIG. 3 illustrates an overview of an exemplary secure IPL process, in accordance with one or more aspects of the present invention.

FIG. 3 illustrates an overview of an exemplary secure IPL process 300, in accordance with one or more aspects of the present invention. FIG. 9 is provided as a simplified concept reference.

The boot record points to the program table that is associated with the particular OS to load. There may be more than one OS architectures and/or versions on the IPL device, such as z/OS® and Linux®.

The program table accesses its associated component table on the boot device (305). The program table, in turn, points to the component table entry (310) which designates the components of the program to load during IPL.

The first component table entry is examined to identify type (315). If the type indicates this component table entry is a signature information entry (type x'03'), then the boot loader loads the signature data from the boot device to a temporary location in computer memory (320). Control returns to 310 to retrieve the next component table entry.

If the type indicates this component table entry is not a signature information entry (type x'03'), then at 325 the type is examined for the indicator that this is a load binary code entry (type x'02'). When the type x'02' component entry is immediately preceded by a type x'03' component entry, the binary code is a signed binary code. If the entry type is type x'02', then control passes to load binary processing 700, which will be discussed further with reference to FIG. 7. If at 325 the entry type is not x'02' load binary, then at 330 the to continue if the component table entry type is not x'01' the IPL terminates. If at 330 the component table entry type is x'01', then control passes to load PSW processing 800, which will be discussed further with reference to FIG. 8.

Figure 7:
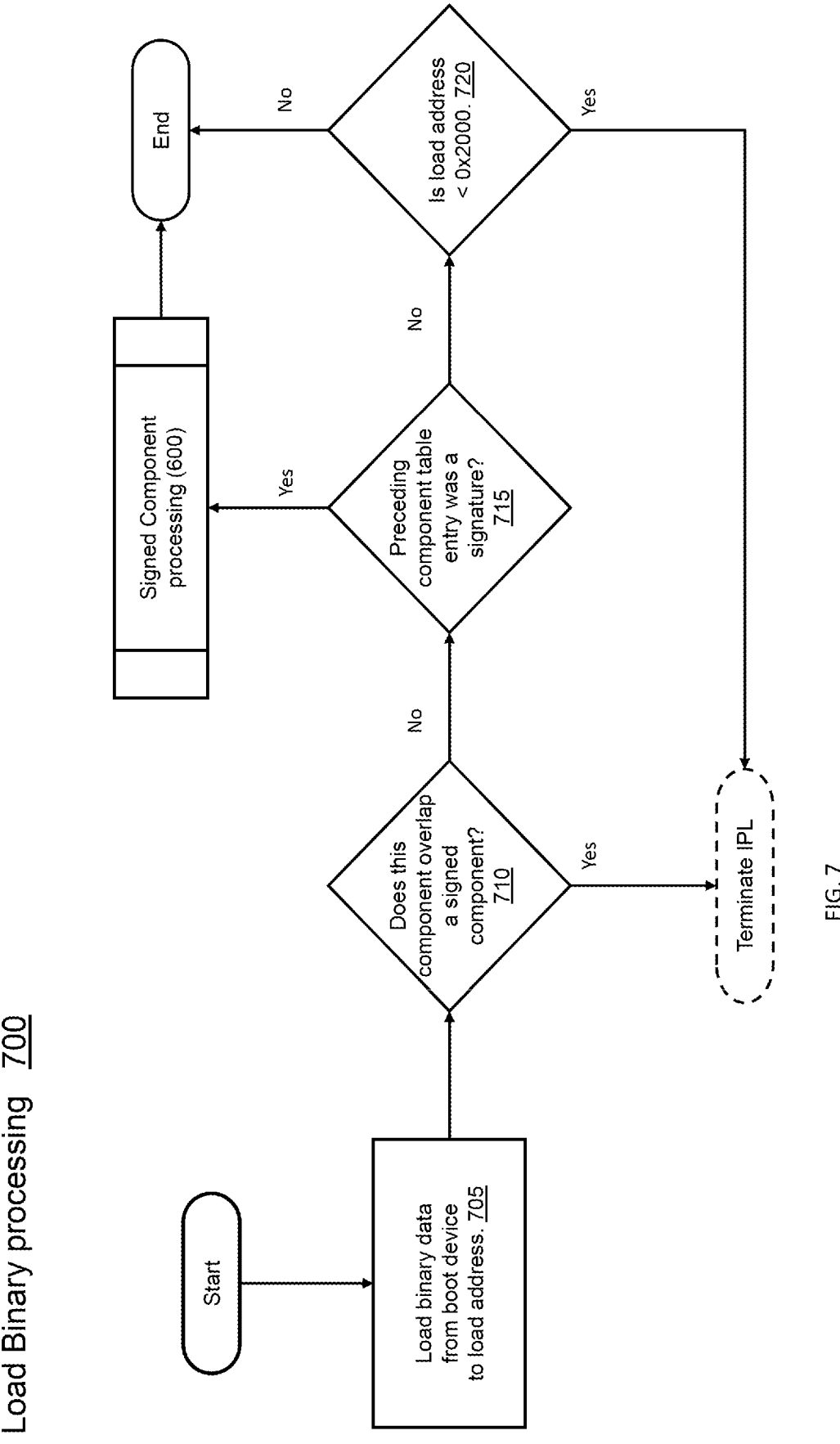
FIG. 7 illustrates an exemplary process for validating and loading signed binary components, in accordance with one or more aspects of the present invention.

Turning now to FIG. 7, the binary data is loaded from the boot device to the load address specified in the component table entry (705). The components may be of variable length, but each one is loaded on an architecture-defined boundary, such as a block, which facilitates validating and locating fields within the entry. If this component overlaps a signed component (710), the IPL terminates because it is likely that tampering occurred with the component table. If there is no overlap (710), then at 715, the boot loader verifies whether the immediately preceding component table entry was a signature information entry (type x'03'). If not, then at 720 the load address in computer memory must be greater than 0x2000, or the IPL terminates. While it is allowable for binary code to be unsigned, the load address is restricted. Most architectures restrict usage of certain areas of real memory for privileged use by hardware and firmware components. For example, in the z/Architecture®, low storage is also used to assign a block of real addresses to a different block in absolute storage, thereby allowing more than one CPU sharing main storage to operate concurrently. (z/Architecture® is the registered trademark of IBM in the United States). If at 715 the preceding component table entry was a signature information entry (type x'03'), then control continues at signed component processing 600 of FIG. 6.

Turning now to FIG. 6, when a binary code component is built, it is signed with a private key. At 605 the boot loader uses the public key to verify the signature. The public key is not stored with the signature information entry but is stored in the firmware-managed storage. The boot loader uses the public key that is associated with the private key that was used to sign the component to validate the digital signature that is inside the signature information entry.

If there is a signature mismatch, that likely indicates unauthorized tampering with the binary component, and the IPL terminates. If the signatures match, then processing continues at SCLAB validity checking 500 of FIG. 5. Assuming the SCLAB is valid, processing returns here to 610, where the SCLAB override load address flag is checked. When the SCLAB override load address flag is not set, the address specified in the type x'02' component entry is used. When the SCLAB override load address flag is set, the storage address specified in the load address field of the SCLAB is compared to the storage address specified in the load binary component entry (type x'02'). If the values match, at 615 the IPL continues. Otherwise, the IPL terminates as it is likely that the address was tampered with to point to malicious code.

Figure 5:
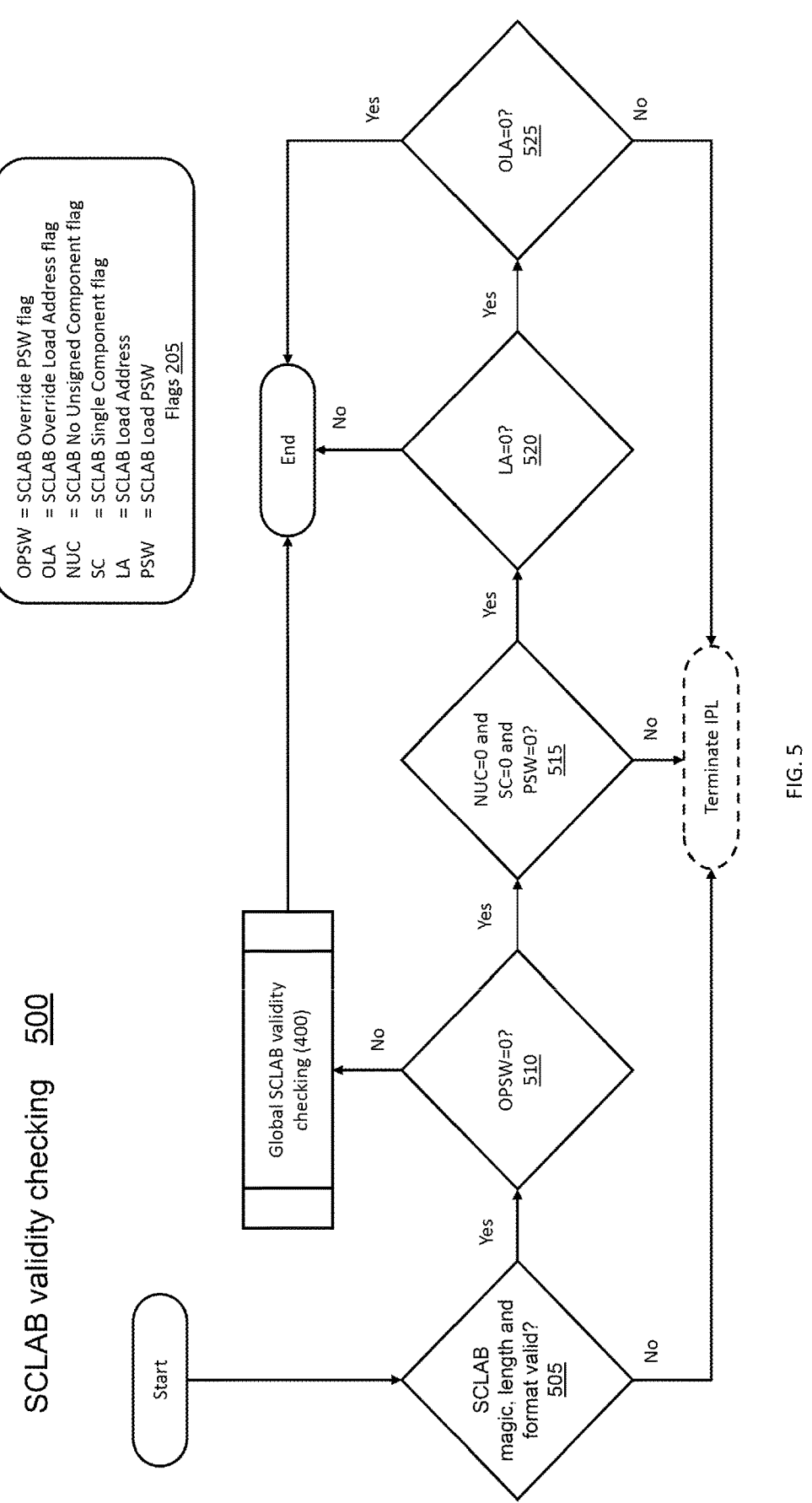
FIG. 5 illustrates an exemplary SCLAB validation process, in accordance with one or more aspects of the present invention.

Turning now to FIG. 5, an exemplary SCLAB validation process is illustrated.

The SCLAB validity checking 500 is entered from 605 of FIG. 6. The SCLAB must be located at the very end of the signed binary code component. The SCLAB magic number 225, fmt 230, length 220, and setting of the flags 205 are verified against the settings that were specified during the software build process to ensure there were no unauthorized modifications. The fmt 230 is used for compatibility and expansion if more than one SCLAB layout is adopted at some point. The magic number 225 field identifies the presence of the SCLAB at the end of the signed binary code component. This value is input during the software build process. The length 220 specifies the number of bytes in the SCLAB. The SCLAB is a variable length control block. Byte '0' of the SCLAB is located by subtracting the number of bytes indicated in the length 220 field from the address of the last byte of the binary code component to which it is attached, plus '1'. Therefore, it is possible to determine whether unauthorized alterations are made to the SCLAB by locating the SCLAB origin and verifying the various fields.

If, at 505, the magic number 225, fmt 230, or length 220 are invalid, the IPL terminates, as it is likely the SCLAB was altered. If, at 505, all of these fields are valid, at 510 the boot loader examines the override PSW flag setting. This flag being set indicates this is a global SCLAB. In that case, processing passes to global SCLAB validity checking 400 of FIG. 4.

At 510, when the override PSW flag is not set, this is a local SCLAB. The PSW specified in the start PSW component entry (type x'01') is not used since local SCLAB does not process the load PSW and the load PSW 210 field in the SCLAB must contain zeroes.

At 515, the boot loader examines the no unsigned component flag (NUC flag), the single component flag (SC flag) from the flags 205 field, and load PSW 210 field. The combination of valid settings in the verification steps of 515, 520, and 525 may be dependent on the implementation. For example, in z/OS® unsigned components are not permitted, as they present a security exposure, so that having this flag set in a z/OS® software build is either a build error or an indication that the binary component may be compromised. In contrast, for Linux® unsigned components are allowed since these typically are parameter files and not executable binary code. However, regardless of the implementation, particular flags and fields (parameters) for a particular machine architecture can be used to tell the boot loader the type and number of components that are stored on the load device which provides another measure of security. For example, another machine architecture may use number of signed components and number of unsigned components fields instead of NUC and SC flags. Therefore, the SCLAB parameters should be defined as restrictive as possible while allowing all known/possible implementations to make the boot process as secure as possible.

Turning now to FIG. 4, an exemplary global SCLAB validation process is illustrated. The global SCLAB validity checking 400 process is entered from 510 of FIG. 5, where it was determined that the SCLAB is a global SCLAB. There is only one global SCLAB, which is typically attached to the first binary component to be loaded. The global SCLAB dictates the code loading process, based on the flag settings and address fields. For example, the override PSW (OPSW) flag, the NUC flag, and the SC flag have global scope and can only be set in the global SCLAB.

At 405, the boot loader examines the OPSW flag to determine if this is the first global SCLAB. If another SCLAB having the OPSW flag set was previously encountered, the IPL terminates. At 410, if the OLA flag is set, the load address 215 value in the SCLAB must match the load address value in the component table for the component containing the SCLAB, otherwise, the IPL terminates.

At 415, the boot loader verifies that the PSW address is within the signed binary component, otherwise IPL terminates. This is to ensure that malicious code was not injected somehow into the binary component.

At 420, the global PSW, NUC, and SC values are stored in the boot loader's local storage. These global SCLAB parameters values will be checked later in Load PSW Processing (800). The reason for later checking is that these parameters values are checked against the contents of unsigned (type x'02') components, signed (type x'02') components, and (initial) load PSW (type x'01') component which may or may not be loaded from the load device at the time the global SCLAB is loaded and checked for its validity. Therefore, the easiest way is for the boot loader to keep track of what it is loading from the load device until all the components are loaded into storage and then check the validity of those saved parameter values against all the components that have been loaded from the load device.

Figure 8:
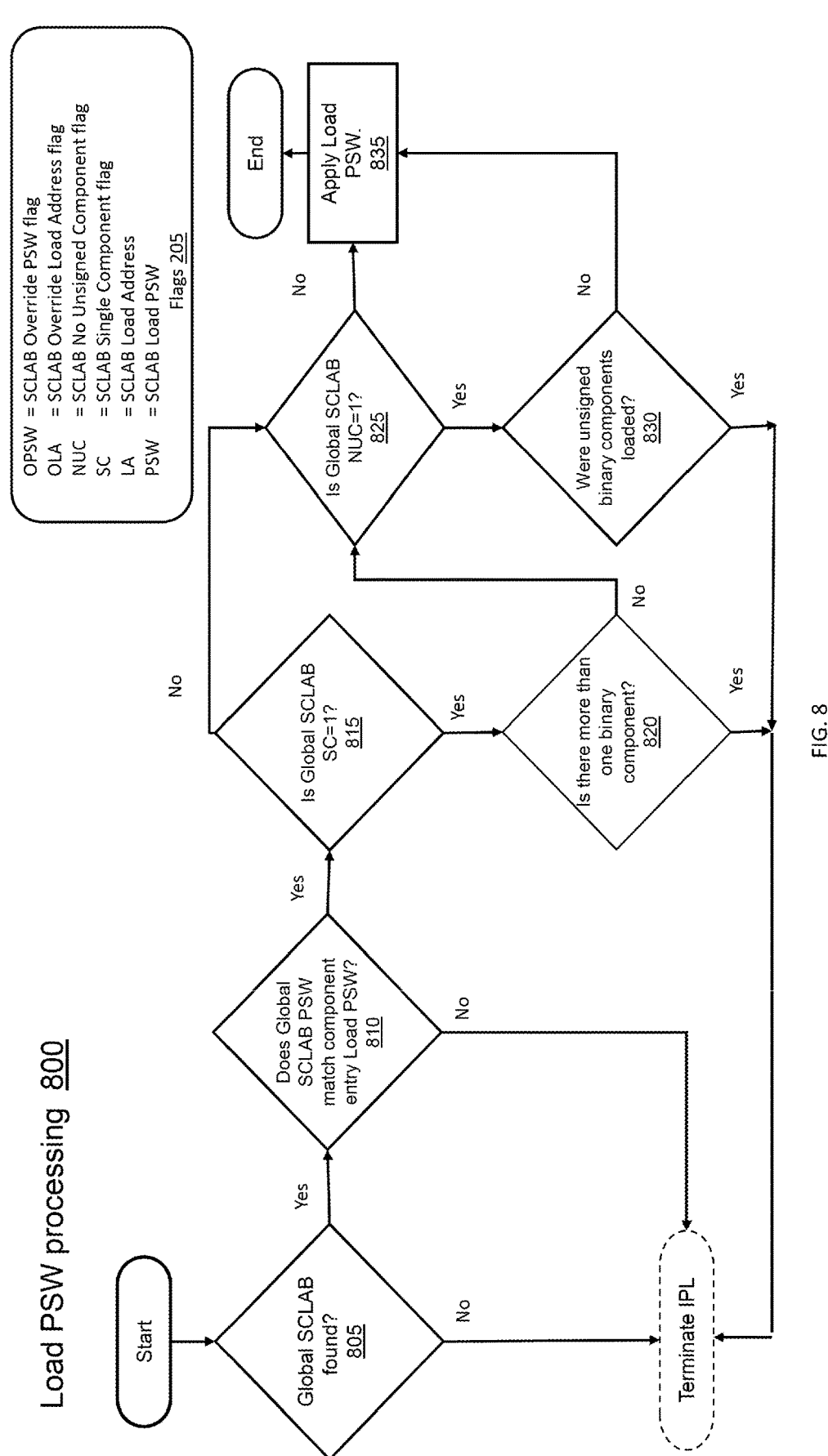
FIG. 8 illustrates an exemplary process for validating and loading the program status word (PSW), in accordance with one or more aspects of the present invention.

Turning now to FIG. 8, an exemplary load PSW processing is illustrated. The load PSW processing 800 is entered from 330 of FIG. 3.

It is assumed that by this stage of the IPL process, a global SCLAB is located (805). If not, IPL terminates.

At 810, the global SCLAB PSW is again verified against the load PSW in the component table entry. If they do not match, IPL terminates.

At 815, the global SCLAB SC flag (single component) is checked. If it is set, and more than one binary component was already loaded (820), the IPL terminates.

At 825, if the global SCLAB NUC flag is set, i.e., unsigned components are not allowed, or no unsigned binary components were previously loaded and the SC flag (single component) is set, at 830 if there is one or more unsigned binary component, IPL terminates. Otherwise, the load PSW is applied (835) and the IPL process ends.

What is claimed is:

1. A method, comprising:
   appending a secure-code-loading-attributes block (SCLAB) to a variable sized signed binary code component to generate a combined component, wherein the variable sized signed binary code component is Operating System (OS) code for an initial program load (IPL) process, and wherein the SCLAB comprises contents including a length field, an identifier, flag fields, a load program status word (PSW) and a load address,
   signing the combined component using a private key, and
   verifying the signed combined component during the IPL.

2. The method of claim 1, wherein the verifying further comprises:
   decrypting, by a system boot loader, a signature of the variable sized signed binary code component and a signature of the SCLAB using a public key, wherein a signature mismatch terminates the IPL;

based on a signature match, validating the SCLAB contents; and
based on the SCLAB contents being valid, continuing the IPL.

3. The method of claim 1, wherein the length field specifies the length of the SCLAB, the SCLAB begins immediately following the signed binary code component, and wherein a start of the SCLAB is determined by subtracting from an end of a variable size signed binary code component address.

4. The method of claim 1, wherein the flag fields comprise a first flag indicating override PSW, wherein when the first flag indicating override PSW is set, a load PSW in the SCLAB is used to start the OS code instead of a PSW specified in an unsigned component table entry.

5. The method of claim 1, wherein the flag fields comprise a second flag indicating override load address, wherein when the second flag indicating override load address is set, a load address in the SCLAB is used instead of the load address specified in an unsigned component table entry.

6. The method of claim 1, wherein the SCLAB contents are set during building the variable sized signed binary code component, and wherein a mismatch of the SCLAB contents to SCLAB contents during the IPL process terminates the IPL.

7. The method of claim 1, wherein the contents in the SCLAB control a load location and a start address in memory without modifying the variable sized signed binary code component.

8. A computer program product, the computer program product comprising a non-transitory tangible storage device having program code embodied therewith, the program code executable by a processor of a computer to perform a method, the method comprising:
   appending a secure-code-loading-attributes block (SCLAB) to a variable sized signed binary code component to generate a combined component, wherein the variable sized signed binary code component is Operating System (OS) code for an initial program load (IPL) process, and wherein the SCLAB comprises contents including a length field, an identifier, flag fields, a load program status word (PSW) and a load address;
   signing the combined component using a private key; and
   verifying the signed combined component against the SCLAB contents during the IPL.

9. The computer program product of claim 8, wherein the verifying further comprises:
   decrypting, by a system boot loader, a signature of the variable sized signed binary code component and a signature of the SCLAB using a public key, wherein a signature mismatch terminates the IPL;
   based on a signature match, validating the SCLAB contents; and
   based on the SCLAB contents being valid, continuing the IPL.

10. The computer program product of claim 8, wherein the length field specifies the length of the SCLAB, the SCLAB begins immediately following the signed binary code component, and wherein a start of the SCLAB is determined by subtracting from an end of a variable size signed binary code component address.

11. The computer program product of claim 8, wherein the flag fields comprise a first flag indicating override PSW, wherein when the first flag indicating override PSW is set, a load PSW in the SCLAB is used to start the OS code instead of a PSW specified in an unsigned component table entry.

12. The computer program product of claim 8, wherein the flag fields comprise a second flag indicating override load address, wherein when the second flag indicating override load address is set, a load address in the SCLAB is used instead of the load address specified in an unsigned component table entry.

13. The computer program product of claim 8, wherein the SCLAB contents are set during building the variable sized signed binary code component, and wherein a mismatch of the SCLAB contents to SCLAB contents during the IPL process terminates the IPL.

14. The computer program product of claim 8, wherein the contents in the SCLAB control a load location and a start address in memory without modifying the variable sized signed binary code component.

15. A computer system, comprising:

one or more processors;

a memory coupled to at least one of the processors;

a set of computer program instructions stored in the memory and executed by at least one of the processors in order to perform actions of:

appending a secure-code-loading-attributes block (SCLAB) to a variable sized signed binary code component to generate a combined component, wherein the variable sized signed binary code component is Operating System (OS) code for an initial program load (IPL) process, and wherein the SCLAB comprises contents including a length field, an identifier, flag fields, a load program status word (PSW) and a load address;

signing the combined component using a private key; and verifying the signed combined component against the SCLAB contents during the IPL.

16. The computer system of claim 15, wherein the verifying further comprises:

decrypting, by a system boot loader, a signature of the variable sized signed binary code component and a signature of the SCLAB using a public key, wherein a signature mismatch terminates the IPL;

based on a signature match, validating the SCLAB contents; and based on the SCLAB contents being valid, continuing the IPL.

17. The computer system of claim 15, wherein the length field specifies the length of the SCLAB, the SCLAB begins immediately following the signed binary code component, and wherein a start of the SCLAB is determined by subtracting from an end of a variable size signed binary code component address.

18. The computer system of claim 15, wherein the flag fields comprise a first flag indicating override PSW, wherein when the first flag indicating override PSW is set, a load PSW in the SCLAB is used to start the OS code instead of a PSW specified in an unsigned component table entry.

19. The computer system of claim 15, wherein the flag fields comprise a second flag indicating override load address, wherein when the second flag indicating override load address is set, a load address in the SCLAB is used instead of the load address specified in an unsigned component table entry.

20. The computer system of claim 15, wherein the SCLAB contents are set during building the variable sized signed binary code component, and wherein a mismatch of the SCLAB contents to SCLAB contents during the IPL process terminates the IPL.

* * * * *